United States Patent
Cogswell et al.

(10) Patent No.: US 10,551,097 B2
(45) Date of Patent: Feb. 4, 2020

(54) REFRIGERATION SYSTEM

(71) Applicant: Carrier Corporation, Farmington, CT (US)

(72) Inventors: Frederick J. Cogswell, Glastonbury, CT (US); Catherine Thibaud, South Windsor, CT (US); Parmesh Verma, South Windsor, CT (US); Bart A. Van Hassel, Weatogue, CT (US); Thomas D. Radcliff, Vernon, CT (US); Abdelrahman ElSherbini, Windsor, CT (US); Robert A. Chopko, Baldwinsville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 62 days.

(21) Appl. No.: 15/526,488

(22) PCT Filed: Sep. 11, 2015

(86) PCT No.: PCT/US2015/049687
§ 371 (c)(1),
(2) Date: May 12, 2017

(87) PCT Pub. No.: WO2016/076947
PCT Pub. Date: May 19, 2016

(65) Prior Publication Data
US 2017/0314826 A1 Nov. 2, 2017

Related U.S. Application Data

(60) Provisional application No. 62/078,753, filed on Nov. 12, 2014.

(51) Int. Cl.
*F25B 25/02* (2006.01)
*F25B 40/02* (2006.01)
(Continued)

(52) U.S. Cl.
CPC .............. *F25B 25/02* (2013.01); *F25B 17/08* (2013.01); *F25B 27/02* (2013.01); *F25B 40/02* (2013.01); *F25B 2315/007* (2013.01)

(58) Field of Classification Search
CPC .......... F25B 25/02; F25B 40/02; F25B 17/08; F25B 27/02; F25B 2315/007; F25B 17/00;
(Continued)

(56) References Cited

U.S. PATENT DOCUMENTS 3,681,934 A * 8/1972 Tudury ..................... F25B 5/02
62/156
4,027,495 A * 6/1977 Edwards ................... F17C 7/02
62/156

(Continued)

FOREIGN PATENT DOCUMENTS

DE 4413032 C1 4/1995
DE 10062174 A1 6/2001
(Continued)

OTHER PUBLICATIONS

International Search Report and Written Opinion for application PCT/US2015/049687, dated Dec. 16, 2015, 12pgs.

*Primary Examiner* — Ana M Vazquez
(74) *Attorney, Agent, or Firm* — Cantor Colburn LLP

(57) ABSTRACT

In one aspect, a refrigeration system is provided. The refrigeration system includes a refrigeration circuit configured to condition an air supply, a subcooling circuit configured to cool the refrigeration circuit, the subcooling circuit including a subcooling condenser, a subcooling heat exchanger, and at least one adsorption bed, and a heat generation system thermally coupled to the subcooling circuit.

13 Claims, 1 Drawing Sheet

(51) Int. Cl.
*F25B 17/08* (2006.01)
*F25B 27/02* (2006.01)

(58) Field of Classification Search
CPC ........ F25B 35/04; F25B 17/083; F25B 9/006; F28F 2013/006; Y02B 30/64; Y02B 30/62; Y02A 30/277; Y02A 30/278; Y02A 30/274
USPC .................................................. 62/335, 238.3
See application file for complete search history.

(56) References Cited

U.S. PATENT DOCUMENTS

| | | | | |
|---|---|---|---|---|
| 4,831,829 | A | * | 5/1989 | Jones ..................... C09K 5/047 62/3.2 |
| 5,005,371 | A | * | 4/1991 | Yonezawa et al. .......... 62/238.6 |
| 5,069,038 | A | * | 12/1991 | Peinze ..................... B01D 5/003 502/34 |
| 5,161,382 | A | * | 11/1992 | Missimer ................ F25B 9/006 62/46.1 |
| 5,313,805 | A | * | 5/1994 | Blackmon .............. F25B 43/043 62/195 |
| 5,505,059 | A | * | 4/1996 | Sanborn ................ F25B 17/083 62/480 |
| 6,314,744 | B1 | | 11/2001 | Ogawa |
| 7,155,927 | B2 | | 1/2007 | Sawada et al. |
| 7,266,967 | B2 | | 9/2007 | Inoue et al. |
| 7,497,089 | B2 | | 3/2009 | Kakiuchi et al. |
| 7,980,092 | B2 | | 7/2011 | Fournier |
| 8,286,437 | B2 | * | 10/2012 | Sanders et al. ................... 62/62 |
| 8,550,633 | B2 | * | 10/2013 | Utsunomiya .......... G02B 27/48 349/64 |
| 8,606,446 | B2 | * | 12/2013 | Ito ........................... B60K 6/46 180/65.265 |
| 2013/0192281 | A1 | | 8/2013 | Nam et al. |
| 2013/0219945 | A1 | * | 8/2013 | Koge ..................... F25B 13/00 62/324.6 |
| 2014/0374058 | A1 | * | 12/2014 | Greiner ............. B60H 1/00492 165/52 |

FOREIGN PATENT DOCUMENTS

| | | |
|---|---|---|
| DE | 102013216462 A1 | 2/2014 |
| EP | 0515923 A2 | 12/1992 |
| JP | H1183235 A | 3/1999 |
| JP | 2005090825 A | 4/2005 |
| JP | 2005308355 A | 11/2005 |
| JP | 2005326073 A | 11/2005 |
| JP | 2011112229 A | 6/2011 |
| JP | 2013181666 A1 | 9/2013 |
| WO | 2006135871 A2 | 12/2006 |
| WO | 2009145278 A1 | 12/2009 |
| WO | 2014028574 A2 | 2/2014 |

* cited by examiner

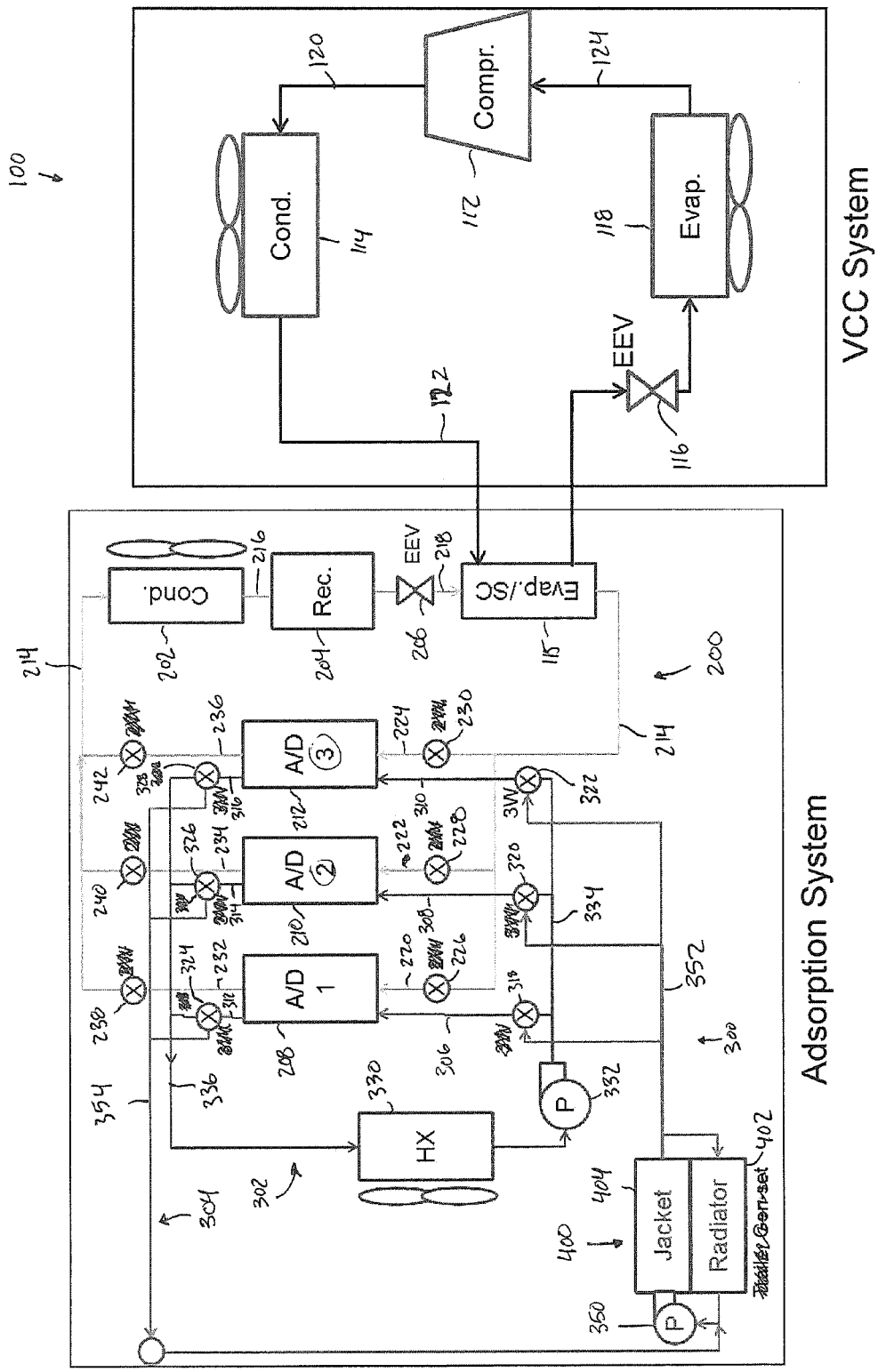

REFRIGERATION SYSTEM

STATEMENT REGARDING FEDERALLY SPONSORED RESEARCH OR DEVELOPMENT

This invention was made with government support under contract number DE-AR0000183 awarded by the Department of Energy. The government has certain rights in the invention.

FIELD OF THE INVENTION

The subject matter disclosed herein relates to refrigeration systems and, more specifically, to transport refrigeration systems with an adsorption based subcooler.

BACKGROUND

Truck trailers used to transport perishable and frozen goods include a refrigerated trailer pulled behind a track cab unit. The refrigerated trailer, which houses the perishable or frozen cargo, requires a refrigeration unit for maintaining a desired temperature environment within the interior volume of the container. The refrigeration unit must have sufficient refrigeration capacity to maintain the product stored within the trailer at the desired temperature over a wide range of ambient air temperatures and load conditions. Refrigerated trailers of this type are used to transport a wide variety of products, ranging for example from freshly picked produce to frozen seafood.

One type of transport refrigeration system used in connection with truck trailers includes an electrically powered refrigeration unit operatively associated with the trailer. The refrigeration unit includes an engine driven electric generator, and the two are contained in a framework that is attached to the front wall of the trailer behind the truck cab. The refrigeration unit circulates air or another gas within the interior volume of the trailer to condition the cargo stored therein. The electric generator is driven by a diesel powered engine and is adapted to produce AC current at a selected voltage and frequency to power components of the refrigeration unit.

It is desirable that truck/trailer refrigeration units operate efficiently over a wide range of refrigeration capacity demands. Further, the refrigeration units must be capable of providing sufficient increased refrigeration capacity during pull-down (i.e., rapid cool down) to reduce the temperature within the cargo box of the trailer down to the desired storage temperature when perishable product is loaded. However, in some known systems, the generator consumes large amounts of fuel to produce power for the refrigeration unit, especially during pull-down. Accordingly, it is desirable to provide supplemental cooling to the refrigeration unit to reduce the fuel consumption and/or size of the generator.

BRIEF DESCRIPTION OF THE INVENTION

In one aspect, a refrigeration system is provided. The refrigeration system includes a refrigeration circuit configured to condition an air supply, a subcooling circuit configured to cool the refrigeration circuit, the subcooling circuit including a subcooling condenser, a subcooling heat exchanger, and at least one adsorption bed, and a heat generation system thermally coupled to the subcooling circuit.

In another aspect, a transportation refrigeration system for a cargo container is provided. The system includes a refrigeration circuit configured to condition a space in the cargo container, and a subcooling circuit having a first adsorption bed, a second adsorption bed, and a third adsorption bed, the subcooling circuit configured to provide cooling to the refrigeration circuit. The system further includes a generator electrically coupled to the refrigeration circuit, and a heat exchange circuit thermally coupled to the generator and the first, second, and third adsorption beds.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a schematic illustration of an exemplary refrigeration system.

DETAILED DESCRIPTION OF THE INVENTION

FIG. 1 illustrates an exemplary refrigeration system 10 that generally includes a refrigeration circuit 100, a subcooling or adsorption circuit 200, a heat exchange circuit 300, and a heat generation system 400 (e.g., an engine or generator 400).

Refrigeration circuit 100 generally includes a compressor 112, a condenser 114, a heat exchanger 115, an expansion device 116, and an evaporator 118. Condenser 114 is arranged to receive high pressure refrigerant or coolant in a vapor state from compressor 112 via a discharge line 120. The refrigerant is condensed in condenser 114 and is supplied to evaporator 118 via a conduit line 122. Typically, the refrigerant in condenser 114 is cooled using cooling water, air, or the like, which carries away the heat of condensation. Heat exchanger 115 functions as a subcooling heat exchanger for refrigeration circuit 100 and as an evaporator for adsorption circuit 200. As such, a first refrigerant circulating within refrigeration circuit 100 is cooled within heat exchanger 115 by a second refrigerant circulating within adsorption circuit 200. In one embodiment, the first refrigerant is R404A and the second refrigerant is ammonia. However, first and second refrigerants may be any suitable refrigerants that enable system 10 to function as described herein.

Expansion device 116 (e.g., an expansion valve) is mounted within conduit line 122 and serves to throttle the liquid refrigerant down to a lower pressure and to regulate the flow of refrigerant through the system. Due to the expansion process, the temperature and pressure of the refrigerant is reduced prior to entering evaporator 118.

In evaporator 118, the refrigerant is brought into heat transfer relationship with a substance to be cooled such as air. The refrigerant at the lower pressure absorbs heat from the substance being cooled and the refrigerant is subsequently vaporized. Saturated vapors are then drawn from evaporator 118 via compressor inlet line 124 and compressed to begin the cycle over again.

In the exemplary embodiment, adsorption circuit 200 generally includes a condenser 202, a receiver 204, an expansion device 206 (e.g., expansion valve), heat exchanger 115, and three adsorption cores or beds 208, 210, and 212. Although three adsorption beds are illustrated in FIG. 1, adsorption circuit 200 may have any suitable number of adsorption beds that enables system 10 to function as described herein. For example, circuit 200 may include two or five beds.

Condenser 202 is arranged to receive the second refrigerant in a vapor state from adsorption beds 208, 210, 212 via a discharge line 214. The refrigerant is condensed in condenser 202 and is supplied via line 216 to receiver 204 where the refrigerant may be stored until required. The refrigerant in condenser 202 is cooled using cooling water, air, or the like, which carries away the heat of condensation. Additionally, the heat of condensation may be stored in a thermal storage system (e.g., phase change material) for future use. Expansion device 206 is mounted within a conduit line 218 and serves to throttle the liquid refrigerant down to a lower pressure and to regulate flow of the refrigerant through the system. Due to the expansion process, the temperature and pressure of the second refrigerant is reduced prior to entering heat exchanger 115.

In heat exchanger 115, the second refrigerant is brought into heat transfer relationship with the first refrigerant circulated through refrigeration circuit 100. The second refrigerant at the lower pressure absorbs heat from the first refrigerant and the second refrigerant is subsequently vaporized. Refrigerant vapors are then drawn from heat exchanger 115 via respective bed inlet lines 220, 222, 224 of adsorption beds 208, 210, 212. Valves 226, 228, and 230 (e.g., two-way valves) are respectively disposed on bed inlet lines 220, 222, 224 to selectively supply refrigerant vapor to beds 208, 210, 212.

Adsorption beds 208, 210, 212 include an adsorbent (e.g., BaCl2) and are configured to operate between an adsorption mode and a desorption mode. In the adsorption mode, the beds adsorb vapor refrigerant from heat exchanger 115. The adsorption beds are subsequently regenerated by heating the adsorbent to desorb the vapor refrigerant. The desorbed refrigerant may then be supplied to condenser 202 to begin the cycle over again. As such, beds 208, 210, 212 include respective outlet lines 232, 234, and 236 with respective valves 238, 240, and 242 to selectively supply the refrigerant vapor to condenser 202, as is described herein in more detail.

Heat exchange circuit 300 generally includes an adsorber cooling circuit 302 and an adsorber heating circuit 304 each fluidly coupled to adsorption beds 208, 210, 212 via respective adsorber inlet lines 306, 308, 310 and adsorber outlet lines 312, 314, 316. Adsorber inlet lines 306, 308, 310 include respective valves 318, 320, 322 (e.g., three-way valves) to selectively supply a third refrigerant to beds 208, 210, 212 from either cooling circuit 302 or heating circuit 304. Similarly, adsorber outlet lines 312, 314, 316 include respective valves 324, 326, 328 (e.g., three-way valves) to selectively supply the third refrigerant from beds 208, 210, 212 to either cooling circuit 302 or heating circuit 304, as described herein in more detail. The refrigerant in lines 306, 308, 310 is in indirect contact with the adsorbent such that heat transfer occurs therebetween.

In the exemplary embodiment, cooling circuit 302 includes a heat exchanger 330, a pump 332, an inlet line 334, and an outlet line 336. Inlet line 334 is fluidly coupled to adsorber inlet lines 306, 308, 310, and outlet line 336 is fluidly coupled to adsorber outlet lines 312, 314, 316. The refrigerant in heat exchanger 330 is cooled using cooling air, water, or the like, and is selectively supplied by pump 332 and valves 318, 320, 322 to adsorption beds 208, 210, 212 that are operating in the adsorption mode. The refrigerant is heated in beds 208, 210, 212 by the heat of adsorption and is subsequently supplied via outlet line 336 back to heat exchanger 330 for subsequent cooling.

Heating circuit 304 includes generator 400, a pump 350, an inlet line 352, and an outlet line 354. Inlet line 352 is fluidly coupled to adsorber inlet lines 306, 308, 310, and outlet line 354 is fluidly coupled to adsorber outlet lines 312, 314, 316. Generator 400 includes a radiator 402 and an engine coolant jacket 404. The fluid in generator 400 is heated as it passes through jacket 404 and cooled as it passes through radiator 402. The heated fluid is selectively supplied by pump 350 and valves 318, 320, 322 to adsorption beds 208, 210, 212 that are operating in the desorption mode. As such, the adsorbent is heated by the waste heat from generator 400, which desorbs the second refrigerant, and the fluid is supplied via outlet line 354 back to generator 400 for heating.

In the exemplary operation, when refrigeration system 10 requires supplemental subcooling, adsorption circuit 200 and heat exchange circuit 300 are activated. In the exemplary embodiment, adsorption bed 208 is operated in desorption mode and adsorption beds 210, 212 are operated in adsorption mode. As such, refrigerant may be supplied from receiver 204 to heat exchanger 115 to provide supplemental subcooling to refrigeration circuit 100 and then adsorbed on beds 210, 212. However, adsorption beds 208, 210, 212 may be operated in various combinations depending on the subcooling requirement. For example, a single adsorption bed may be operated in adsorption mode if less supplemental cooling is required; all three adsorption beds may be operated in adsorption mode if more supplemental cooling is required; or the adsorption beds may be switched between adsorption mode and desorption mode to provide a constant supply of subcooling to refrigeration circuit 100 without need for storage in receiver 204 (i.e., a continuous operation mode).

In this operation, the desorbing bed 208 requires heat from heating circuit 304 to facilitate the desorption process, and the adsorbing beds 210, 212 require cooling from cooling circuit 302 to facilitate the adsorption process. As such, valve 318 is opened to conduit 352 (closed to conduit 334) to supply heated fluid or refrigerant from generator 400 to bed 208 for desorption of refrigerant stored therein. Valves 320 and 322 are closed to conduit 352, but are open to inlet conduit 334 to supply cooled fluid or refrigerant from heat exchanger 330 to beds 210, 212 to facilitate adsorption of refrigerant therein.

Downstream of the adsorption beds, valve 324 is open to conduit 354 (closed to conduit 336) to return the cooled fluid or refrigerant to generator 400. Valves 326, 328 are open to conduit 336 (closed to conduit 354) to return the fluid or refrigerant heated by the adsorption process to heat exchanger 330 for subsequent cooling.

With adsorption bed 208 in desorbing mode and saturated with refrigerant, valve 226 is closed to prevent receipt of vapor refrigerant from heat exchanger 115. Valve 238 is open to supply the desorbed refrigerant to receiver 204 for subsequent storage or to provide cooling in heat exchanger 115. With adsorption beds 210, 212 in adsorbing mode and free of stored refrigerant, valves 228, 230 are open to receive vapor refrigerant from heat exchanger 115. Valves 240, 242 are closed to conduits 234, 236, 214 while the refrigerant received through conduits 222, 224 is adsorbed in beds 210, 212.

When adsorption bed 208 is empty of refrigerant and/or when adsorption beds 210, 212 are saturated with refrigerant, the operation mode of the beds may be switched. As such, adsorption bed 208 may now be operated in adsorption mode while adsorption beds 210, 212 may be operated in desorption mode.

In this mode, valve 318 is open to conduit 334 (closed to conduit 352) to supply cooled refrigerant from heat exchanger 330 to bed 208 to facilitate adsorption of refrigerant therein. Valves 320, 322 are open to conduit 352 (closed to conduit 334) to supply heated fluid or refrigerant from generator 400 to beds 210, 212 for desorption of refrigerant stored therein.

Downstream of the adsorption beds, valve 324 is open to conduit 336 (closed to conduit 354) to return the refrigerant heated by the adsorption process to heat exchanger 330 for subsequent cooling. Valves 326, 328 are open to conduit 354 (closed to conduit 336) to return the cooled refrigerant to generator 400.

With adsorption beds 210, 212 in desorbing mode and saturated with refrigerant, valves 228, 230 are closed to prevent receipt of vapor refrigerant from heat exchanger 115. Valves 240, 242 are opened to supply the desorbed refrigerant to receiver 204 for subsequent storage or to provide cooling heat exchanger 115. With adsorption bed 208 in adsorbing mode, valve 226 is open to receive vapor refrigerant from heat exchanger 115. Valve 238 is closed to conduit 232, 214 while the refrigerant received through conduit 220 is adsorbed in bed 208. As such, the process may be repeated, and adsorption beds 208, 210, 212 may be alternated between adsorption/desorption modes to provide the desired cooling to refrigeration circuit 100. Additionally, adsorption circuit 200 may be disconnected from refrigeration circuit 100 and function as a standalone heating/cooling system.

The systems and methods described herein provide a transportation refrigeration system with a subcooling circuit. The subcooling circuit includes two or more adsorption beds that operate between an adsorption mode to store vapor refrigerant and a desorption mode to release the stored vapor refrigerant. The subcooling circuit utilizes waste heat from the refrigeration system generator to desorb the vapor refrigerant. The desorbed refrigerant is condensed, expanded, and supplied to a subcooling heat exchanger to subsequently provide additional cooling to refrigerant circulating in a primary refrigerant circuit. By utilizing waste heat of the generator in the subcooling circuit, the size and fuel consumption of the generator is reduced.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A refrigeration system comprising:
   a refrigeration circuit configured to condition an air supply, wherein the refrigeration circuit comprises a compressor, a condenser, an expansion device and an evaporator in a serial flow arrangement;
   a subcooling circuit including a subcooling condenser, a subcooling heat exchanger, and at least one adsorption bed, wherein the subcooling heat exchanger is fluidly coupled to the refrigeration circuit between the condenser and the evaporator, the subcooling heat exchanger providing heat transfer between the refrigeration circuit and the subcooling circuit, the subcooling heat exchanger configured to provide subcooling to the refrigeration circuit and configured as an evaporator in the subcooling circuit; and
   a heat generation system thermally coupled to the subcooling circuit;
   wherein an inlet of the subcooling heat exchanger receives refrigerant from an outlet of the condenser;
   wherein an inlet of the expansion device receives refrigerant from an outlet of the subcooling heat exchanger.

2. The system of claim 1, wherein the at least one adsorption bed comprises a first adsorption bed, a second adsorption bed, and a third adsorption bed.

3. The system of claim 1, further comprising a receiver fluidly coupled between the subcooling condenser and the subcooling heat exchanger.

4. The system of claim 1, wherein the heat generation system comprises a generator having a radiator and a jacket thermally coupled to the subcooling circuit.

5. The system of claim 1, further comprising a heat exchange circuit configured to transfer thermal energy between the subcooling circuit and the heat generation system.

6. The system of claim 5, wherein the refrigeration circuit comprises a first fluid, the subcooling circuit comprises a second fluid, and the heat exchange circuit comprises a third fluid.

7. The system of claim 5, wherein the heat exchange circuit comprises a cooling circuit and a heating circuit, the cooling circuit configured to cool a first portion of the subcooling circuit, and the heating circuit configured to heat a second portion of the subcooling circuit.

8. The system of claim 7, wherein the heat generation system is thermally coupled to the heating circuit to transfer heat generated by the heat generation system to the subcooling circuit.

9. The system of claim 7, wherein the cooling circuit comprises a heat exchanger.

10. A transportation refrigeration system for a cargo container, the system comprising:
    a refrigeration circuit configured to condition a space in the cargo container, wherein the refrigeration circuit comprises a compressor, a condenser, an expansion device and an evaporator in a serial flow arrangement;
    a subcooling circuit having a first adsorption bed, a second adsorption bed, and a third adsorption bed, the subcooling circuit configured to provide cooling to the refrigeration circuit, wherein a subcooling heat exchanger is fluidly coupled to the refrigeration circuit between the condenser and the evaporator, the subcooling heat exchanger providing heat transfer between the refrigeration circuit and the subcooling circuit, the subcooling heat exchanger configured to provide subcooling to the refrigeration circuit and configured as an evaporator in the subcooling circuit;
    a generator electrically coupled to the refrigeration circuit; and
    a heat exchange circuit thermally coupled to the generator and the first, second, and third adsorption beds;
    wherein an inlet of the subcooling heat exchanger receives refrigerant from an outlet of the condenser;
    wherein an inlet of the expansion device receives refrigerant from an outlet of the subcooling heat exchanger.

11. The transportation refrigeration system of claim 10, wherein the heat exchange circuit comprises a cooling circuit having a heat exchanger, and a heating circuit thermally coupled to the generator, the cooling circuit selectively providing a refrigerant to the first, second, and third adsorption beds when the first, second, and/or third adsorption beds are operating in an adsorption mode, and the heating circuit selectively transferring waste heat of the generator to the first, second, and third adsorption beds when the first, second, and/or third adsorption are operating in a desorption mode.

12. The transportation refrigeration system of claim 11, further comprising:
    first three-way valves fluidly coupled between the cooling circuit, the heating circuit, and the first, second, and third adsorption beds, the first three-way valves configured to selectively supply refrigerant from the cooling circuit or the heating circuit to an inlet of the first, second, and/or third adsorption beds; and
    second three-way valves fluidly coupled between the first, second, and third adsorption beds, the cooling circuit, and the heating circuit, the second three-way valves configured to selectively supply refrigerant from the first, second, and third adsorption beds to the cooling circuit or the heating circuit.

13. The transportation refrigeration system of claim 10, wherein the subcooling circuit further comprises:
    a condenser;
    the subcooling heat exchanger;
    outlet lines fluidly coupled between the first, second, and third adsorption beds and the condenser;
    a first two-way valve disposed on each of the outlet lines;
    inlet lines fluidly coupled between the subcooling heat exchanger and the first, second, and third adsorption beds; and
    a second two-way valve disposed on each of the inlet lines.

* * * * *